(12) United States Patent
Breisch

(10) Patent No.: US 9,216,457 B2
(45) Date of Patent: Dec. 22, 2015

(54) HOLDER ASSEMBLY FOR A CUTTING TOOL INSERT AND A CUTTING TOOL

(71) Applicant: SANDVIK INTELLECTUAL PROPERTY AB, Sandviken (SE)

(72) Inventor: Anders Breisch, Sandviken (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 325 days.

(21) Appl. No.: 14/010,703

(22) Filed: Aug. 27, 2013

(65) Prior Publication Data

US 2014/0064862 A1    Mar. 6, 2014

(30) Foreign Application Priority Data

Aug. 29, 2012  (EP) .................................... 12182213

(51) Int. Cl.
    *B23B 27/04*    (2006.01)
    *B23B 27/10*    (2006.01)
    *B23B 29/04*    (2006.01)
    (Continued)

(52) U.S. Cl.
    CPC ................. *B23B 27/16* (2013.01); *B23B 27/10* (2013.01); *B23B 27/1666* (2013.01); *B23B 29/043* (2013.01); *B23B 29/12* (2013.01); *B23B 2205/02* (2013.01); *B23B 2240/24* (2013.01); *B23B 2250/12* (2013.01); *B23B 2260/0785* (2013.01); *B23B 2260/136* (2013.01);
    (Continued)

(58) Field of Classification Search
CPC ............ B23B 2205/02; B23B 2240/24; B23B 2260/136; B23B 2260/0785; B23B 27/16; B23B 27/1666; B23B 29/043; B23B 29/12; Y10T 407/2286; Y10T 407/2288

USPC ........ 407/11, 107–111, 117, 91, 101; 408/56, 408/57
See application file for complete search history.

(56) References Cited

U.S. PATENT DOCUMENTS 2,865,084 A * 12/1958 Wendt ................. B23B 27/1666
                                                    407/109
3,156,031 A * 11/1964 Gustav ................ B23B 27/1633
                                                    407/109

(Continued)

FOREIGN PATENT DOCUMENTS

AT             8377 U1    7/2006
EP         0312223 A1    4/1989

(Continued)

*Primary Examiner* — Sunil K Singh
*Assistant Examiner* — Sara Addisu
(74) *Attorney, Agent, or Firm* — Corinne R. Gorski

(57) ABSTRACT

A holder assembly for a cutting tool insert for machining operations. The holder assembly has first and second spaced apart clamping members, each having respective inner seating surfaces facing one another and defining an intermediate gap to receive the cutting tool. The clamping members are movable towards each other by a clamping mechanism to clamp and secure the cutting tool insert between the seating surfaces. The clamping mechanism includes a drawbar that is received in a cavity formed in each of the clamping members and are aligned with each other and extends in a transverse direction in relation to the intermediate gap. The clamping mechanism also includes a compression spring member, which presses the clamping members towards each other to secure clamping of the cutting tool insert. The clamping mechanism is released by a releasing member that overcomes the spring force acting to move the clamping members towards each other.

12 Claims, 6 Drawing Sheets

(51) Int. Cl.
*B23B 27/16* (2006.01)
*B23B 29/12* (2006.01)

(52) U.S. Cl.
CPC ......... *Y10T 407/14* (2015.01); *Y10T 407/2286* (2015.01); *Y10T 407/2288* (2015.01)

(56) References Cited

U.S. PATENT DOCUMENTS

| | | | | |
|---|---|---|---|---|
| 3,191,262 A * | 6/1965 | Gustafson | ........... | B23B 27/1674 407/109 |
| 3,331,116 A * | 7/1967 | Fussenhauser | ..... | B23B 27/1674 407/101 |
| 3,375,742 A * | 4/1968 | Sturm | ...................... | B23B 29/20 29/35.5 |
| 3,798,725 A * | 3/1974 | Hanson | ................... | B23B 29/04 407/108 |
| 3,821,837 A * | 7/1974 | Faber | ...................... | B23B 27/16 407/109 |
| 3,837,058 A * | 9/1974 | Barkley | .............. | B23B 27/1659 407/103 |
| 3,844,008 A * | 10/1974 | Sletten | .................... | B23B 27/04 407/101 |
| 4,030,176 A * | 6/1977 | Michonski | ........... | B23B 29/046 407/107 |
| 4,111,587 A * | 9/1978 | Hatanaka | ................ | B23B 27/16 279/46.7 |
| 4,244,666 A * | 1/1981 | Erickson | ............ | B23B 27/1677 407/105 |
| 4,321,846 A * | 3/1982 | Neamtu | .................. | B23B 29/04 407/107 |
| 4,400,116 A * | 8/1983 | Buchmann | .......... | B23B 27/1674 407/100 |
| 4,480,950 A * | 11/1984 | Kraft | ................... | B23B 27/1651 407/103 |
| 4,621,547 A * | 11/1986 | Yankoff | ................ | B23B 27/167 407/11 |
| 4,848,198 A * | 7/1989 | Royal | ..................... | B23B 25/02 407/11 |
| 4,848,979 A * | 7/1989 | Simmons | ............ | B23B 27/1622 407/102 |
| 5,100,268 A * | 3/1992 | Nakayama | .......... | B23B 27/1677 407/104 |
| 5,340,242 A * | 8/1994 | Armbrust | ................ | B23B 25/02 407/11 |
| 5,586,844 A * | 12/1996 | Nyman | ............... | B23B 27/1677 407/105 |
| 5,704,734 A * | 1/1998 | Ashley | ................ | B23B 27/1633 407/100 |
| 5,944,457 A * | 8/1999 | Tjernstrom | ......... | B23B 27/1677 407/105 |
| 6,010,281 A * | 1/2000 | Coutat | ................... | B23B 27/04 407/107 |
| 6,168,357 B1 * | 1/2001 | Coutat | ................... | B23B 27/04 407/101 |
| 6,186,704 B1 * | 2/2001 | Hale | ....................... | B23B 27/04 407/101 |
| 6,409,435 B1 * | 6/2002 | Kocherovsky | ........ | B23B 27/045 407/104 |
| 6,814,526 B2 * | 11/2004 | Shiraiwa | ................. | B23B 27/04 407/107 |
| 7,758,286 B2 * | 7/2010 | Nagaya | ................. | B23B 29/043 407/101 |
| 7,780,380 B2 * | 8/2010 | Nagaya | ................. | B23B 29/043 407/101 |
| 7,896,585 B2 * | 3/2011 | Hecht | .................... | B23B 27/04 407/110 |
| 8,827,598 B2 * | 9/2014 | Henry | ..................... | B23B 27/04 407/11 |
| 2003/0039518 A1 * | 2/2003 | Andras | ................. | B23B 27/045 407/109 |
| 2006/0140728 A1 * | 6/2006 | Giannetti | ................ | B23B 27/10 407/11 |
| 2007/0196187 A1 * | 8/2007 | Nelson | ............... | B23B 27/1662 407/91 |
| 2007/0283794 A1 * | 12/2007 | Giannetti | ................ | B23B 27/10 82/158 |
| 2008/0124180 A1 * | 5/2008 | Breisch | ................... | B23B 27/10 407/110 |
| 2008/0131215 A1 * | 6/2008 | Sjoo | ........................ | B23B 27/04 407/110 |
| 2012/0003053 A1 * | 1/2012 | Park | ...................... | B23B 27/167 407/107 |
| 2012/0230780 A1 * | 9/2012 | Henry | ..................... | B23B 27/10 407/11 |
| 2013/0129428 A1 * | 5/2013 | Henry | ..................... | B23B 27/04 407/11 |
| 2013/0129438 A1 * | 5/2013 | Ben Amor | .......... | B23B 27/1651 407/109 |
| 2013/0202372 A1 * | 8/2013 | Hecht | .................... | B23B 27/10 407/107 |
| 2013/0236256 A1 * | 9/2013 | Kaufmann | ............. | B23B 27/04 407/107 |
| 2014/0133924 A1 * | 5/2014 | Oren | ...................... | B23B 29/043 407/11 |

FOREIGN PATENT DOCUMENTS

| | | | |
|---|---|---|---|
| EP | 1252954 A1 | 10/2002 | |
| JP | 2002337009 A | * 11/2002 | |
| WO | 9950012 A1 | 10/1999 | |
| WO | WO 2005084947 A1 | * 9/2005 | ............. B23B 27/10 |

* cited by examiner

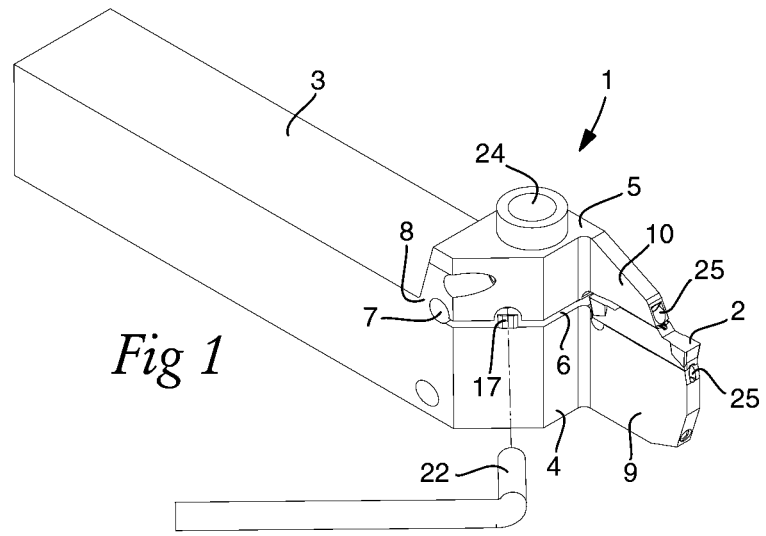
Fig 1
Fig 2
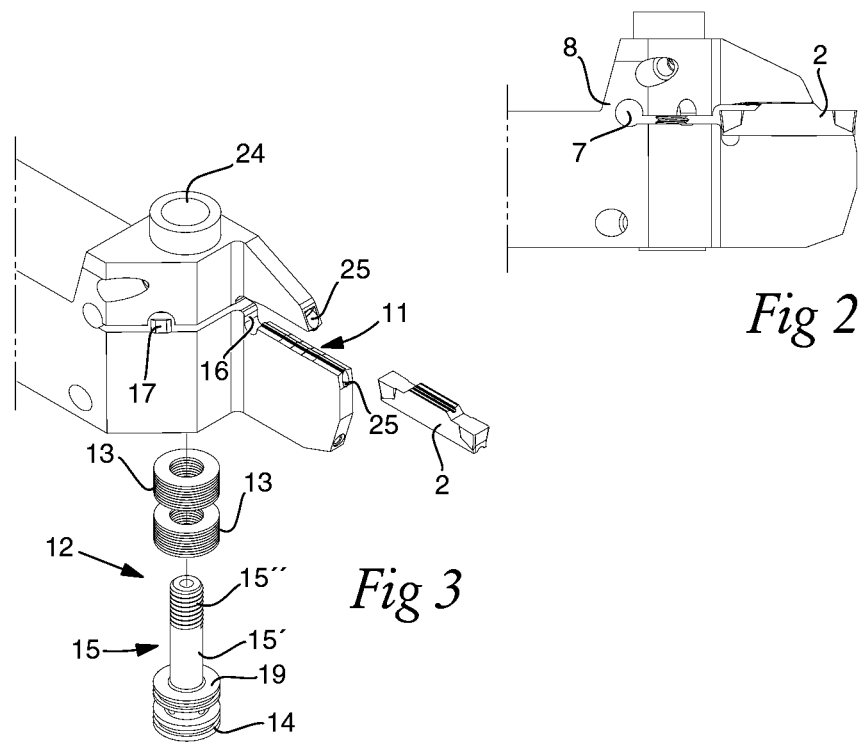
Fig 3

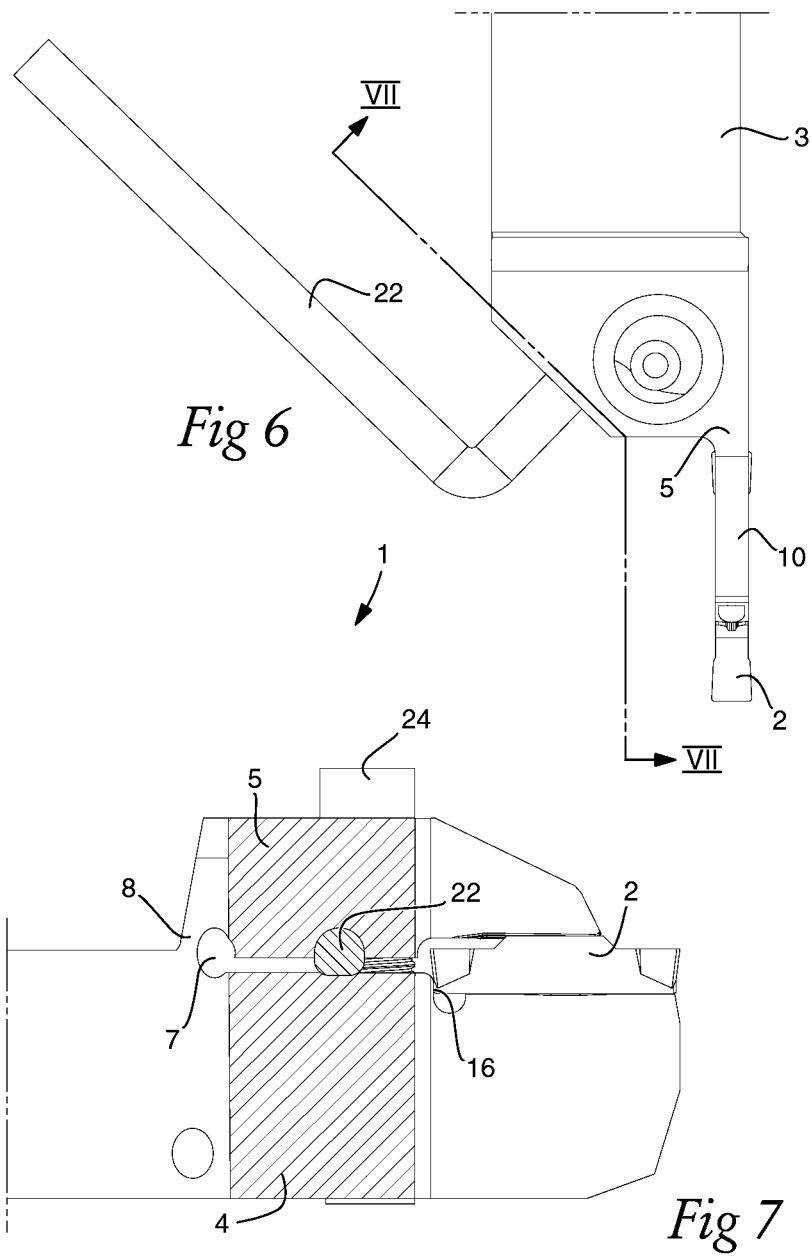

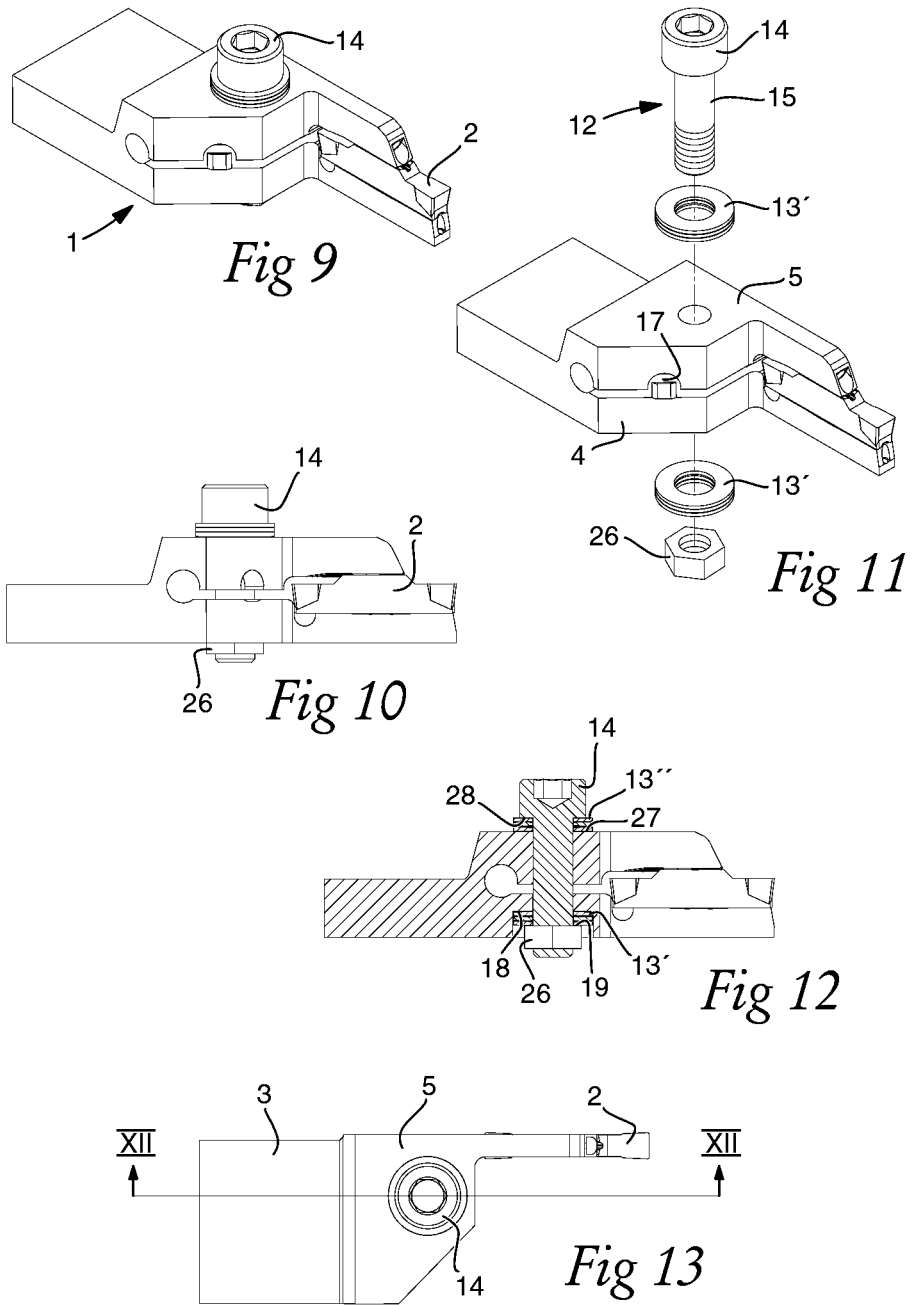

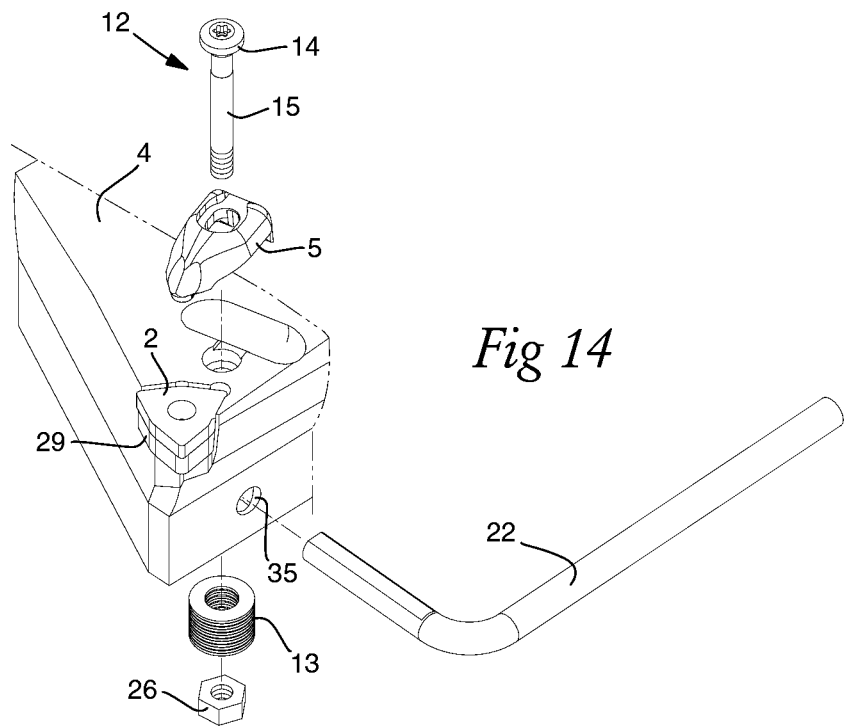
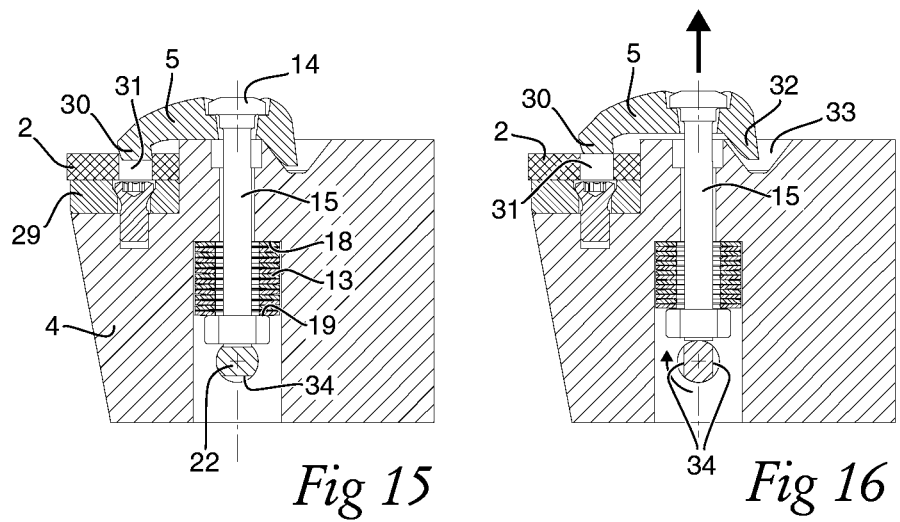

HOLDER ASSEMBLY FOR A CUTTING TOOL INSERT AND A CUTTING TOOL

RELATED APPLICATION DATA

This application claims priority under 35 U.S.C. §119 to European Patent Application No. 12182213.4, filed on Aug. 29, 2012, which the entirety thereof is incorporated herein by reference.

The present invention relates to a holder assembly for a cutting tool insert adapted for machining operations, the holder assembly comprising first and second spaced apart clamping members, each having respective inner seating surfaces facing one another and defining an intermediate gap, in which the cutting tool insert is insertable, wherein the clamping members are by means of a clamping mechanism, at least to a limited extent movable towards each other, in order to clamp and securely hold the cutting tool insert between the seating surfaces, and subsequently movable away from each other by releasing the clamping mechanism in order to release the cutting tool insert from the holder assembly, wherein the clamping mechanism is at least partly received in a cavity formed in each of the clamping members, which cavities are aligned with each other and extend in a transverse direction in relation to the intermediate gap.

BACKGROUND OF THE INVENTION

For machining operations in metals it is known many different holder assemblies for secure clamping of a cutting tool insert between opposed seating surfaces of clamping jaws or clamping members, which at least to some extent are movable towards and away from each other. The cutting tool inserts are normally made of an expensive and high quality hard metal alloy and therefore it is desirable to make these as small as possible in order to save costs. These conditions puts heavy demands on the holder assemblies to be able to securely clamp the tiny cutting tool inserts to prevent that they will inadvertently be released during the machining operation. Due to the small dimensions of the cutting tool inserts, also the contact surfaces between the clamping members and the cutting tool inserts will be very small. Accordingly, the contact pressure between the clamping members and the cutting tool inserts has to be high to resist the forces, which the inserts will be exposed to during machining. However, the contact pressure is not allowed to be too high since in that case the cutting tool insert might break during clamping or machining operation.

Normally, the clamping pressure between the clamping members is adjusted by means of at least one screw, which is tightened to a certain degree in order to clamp the clamping members towards the cutting tool insert. Accordingly, in order to ensure a sufficient clamping pressure but avoid a too high clamping pressure, which might damage the cutting tool insert, an operator performing a change of cutting tool insert is normally forced to use a torque wrench to ensure correct tightening of the screw. The responsibility for applying the correct clamping force onto the cutting tool insert is accordingly resting on the operator, which gives rise to risks for mistakes. Moreover, releasing and clamping of the cutting tool insert by means of a screw and tightening by means of a torque wrench is time consuming.

From EP 1252954 it is known a cutting tool including a holder assembly in which the clamping mechanism comprises two screws in an angle in relation to each other. One first screw, which functions as a drawbar, is screwed into a first clamping jaw and rests with its head in a seating in a second clamping jaw. The second screw extends in an angle in relation to the first screw and is positioned such that the tip of the second screw meets the head of the first screw. When tightening the second screw it will bear against a conical surface on the head of the first screw such that the first screw will draw the first jaw towards the second jaw when the second screw is tightened as far as it is possible. In this position, the first screw can be used to set the desired clamping force on the cutting tool insert positioned between the first and second clamping jaws. Subsequently, the cutting tool insert can be released by merely loosen the second screw and after exchange of cutting tool insert, the second screw can be tightened as far as it is possible until it is completely stopped against the first screw. In this position the first screw will be automatically drawn to the set position in which the clamping pressure on the cutting tool insert is at the set desirable level without any need for using a torque wrench when tightening. However, this cutting tool suffers from several disadvantages. First of all it is somewhat time consuming to unscrew and tighten the second screw when exchanging the cutting tool insert and after frequently exchanging the cutting tool insert, the tool engagement formations on the second screw may become worn. It is also a risk that the cutting tool insert will not be clamped by the correct clamping pressure since even very small variations of the dimensions of the cutting tool insert will vary the clamping pressure a great deal. Also wear of the contact surfaces between the first and second screws will have a large impact on the clamping force. Furthermore, it is also a possibility that the operator is not careful to draw the second screw until it is completely tightened and stopped against the first screw which will result in an incorrect clamping pressure. The cutting tool as disclosed in EP 1252954 also requires two bores with different orientation, as well as internal threads for each of these bores, which makes the cutting tool expensive and time consuming to produce.

SUMMARY OF THE INVENTION

It is an object of the present invention to provide a holder assembly, by which it is possible to automatically achieve the correct clamping force within narrow tolerances onto the cutting tool insert.

The invention also relates to a cutting tool having essentially the same object as above.

Additional objects and features of the invention will be apparent from the following description and drawings of embodiments of the invention.

The basis for the invention may be achieved by a holder assembly by providing the clamping mechanism with a compression spring member, which acts on the drawbar. The drawbar is positioned with a first portion within the cavity of the first clamping member and is in engagement with that clamping member, whereas a second portion of the drawbar is positioned within the cavity of the second clamping member and is in engagement with that clamping member. At least the first clamping member is provided with a shoulder face within or around the cavity which is facing away from an intermediate gap and the first portion of the drawbar is provided with a counter face facing towards the shoulder face and is to at least some extent displaceable within the cavity of the first clamping member. The compression spring member is positioned between the shoulder face and the counter face such that the shoulder face and the counter face are forced away from each other which lead to that the first and the second clamping members are pressed towards each other by means of the compression spring member. For the purpose of allowing removal of a cutting tool insert and inserting of another, the spring force acting to move the clamping members towards each other can be overcome by means of a releasing member, which is able to separate the seating surfaces a distance from each other.

Within this overall idea the inventive holder assembly can be varied and modified in many different ways. In a hereinafter described and illustrated first embodiment, the drawbar is in form of a screw or bolt having a thread in one end and a head in the other end. The thread is in engagement with a female thread in a bore of the second clamping member, whereas the underside of the head functions as the counter face, which is facing a shoulder face, provided within a cavity or bore in the first clamping member.

In a second embodiment, the drawbar is a bolt having a head in one end and a nut in the other and the shaft of the drawbar is at least to a limited extent displaceable within the cavity or bore of the first as well as the second clamping member. A compression spring member is positioned between the head and a shoulder face in form of an upper surface of the second clamping member as well as between the nut and a shoulder face provided in a countersink in the first clamping member.

The holder assemblies of both the first and the second embodiments are of a type where the clamping members are in form of clamping jaws which are integrated with each other and connected via a flexible joint in form of an elastic material portion forming a hinge joint. The cutting tool inserts are attached by means of a frictional engagement in a direction straight out from the holder assembly. This kind of engagement is suitable for a holder assembly being formed with a flexible pivot since in that case only small movements of the clamping jaws are required for removing and inserting of cutting tool inserts.

In a hereinafter described and illustrated third embodiment of the invention, the first and second clamping members are separate components, which are connected by means of a bolt having a head in one end, resting in a countersink in the upper or second clamping member, and a nut in the other end, which is received in a countersink in the lower or first clamping member. The compression spring member is positioned between a counter face on the nut and a shoulder face in the end of the countersink. Here the attachment between the clamping members and the cutting tool insert is a structural engagement since a downward projecting pin of the second clamping member engages a recess in the cutting tool insert. In such a case the movement between the clamping members has to be larger when removing and inserting of a cutting tool insert and therefore it is more advisable to make the clamping members as separate components.

However, it is to be understood that the drawbar could also be designed in many other ways. For example, it does not have to be formed with a circular cross section but any other cross sectional shapes could be conceivable. Instead of a head it could be provided with any other form of enlarged portion that could function as a counter face, e.g. a pin, and it does not need to be formed with a thread for engagement with the cavity or bore of the clamping member but any other type of member or formation that can provide engagement between the clamping member and the drawbar would be possible.

A releasing member or tool for effecting widening of the gap or space between the clamping members, can be formed and function in many different ways. In all three of the described and illustrated embodiments, the releasing tool comprises a shank having en engagement formation in form of a non-circular cross sectional shape. In the two first embodiments, the non-circular shank is insertable between the clamping jaws where a suitable formed recess is provided and by rotating the shank the space or gap between the clamping jaws can be widened in a certain rotated position of the shank. In the third embodiment, the shank acts upon the end of the bolt instead. However, the releasing member could be formed in many different ways, e.g. have a square, circular or any other cross-sectional shape, and every embodiment which could widen the space or gap between the clamping members could be conceivable. Moreover, holes or recesses for insertion of a releasing member could be positioned in different locations in relation to the position of the drawbar and can be provided in several positions on one and the same holder assembly, to enable change of cutting tool insert from different directions when the cutting tool is mounted in a machine and the space is limited. Also, the releasing member could be for instance hydraulically or pneumatically operated.

In all of the described and illustrated embodiments, the compression spring member is a cup spring comprising several cup-shaped washers stacked upon each other. An advantage with a cup spring is that a very strong spring force can be achieved in a short compression length and the length as well as the spring force of the compression spring member can easily be adjusted by varying the number of cup-shaped washers and vary their orientation in the stack, e.g. to turn all of the concave sides of the cup-shaped washers in the same direction, to turn the concave sides of half of the stack of cup-shaped washers in one direction and the other half of the stack in the other, or to turn the concave sides of consecutive cup-shaped washers alternately in one direction and alternately in the other direction. An advantage with the last mentioned embodiment is that the length of stroke of the spring member becomes longer, which makes it possible to provide a larger opening between the clamping members, which makes it easier to change cutting tool inserts. However, it is to be understood that also other types of compression spring members could be conceivable.

In the hereinafter described and illustrated first embodiment, the drawbar is in form of a bolt having internal channels. This is done to facilitate supply of water or other cooling or lubricating fluids to the tips of each of the clamping members for cooling and/or lubricating purposes during machining operation.

One great advantage with providing a clamping mechanism with a compression spring member in a way as described and illustrated herein, is that a cutting tool insert can be released and mounted by means of a suitable formed releasing member without being forced to rotate any screw or bolt for separating and tightening the clamping members, which makes the replacement of cutting tool inserts quick and easy. The clamping force that is transferred from the compression spring member to the clamping members can be preset once and for all, which has to result that the clamping force on the cutting tool insert always will be correct within close tolerances and, due to the spring action, any wear of incorporated components or differing measures of the cutting tool inserts will have no or very small impact on the achieved clamping force.

In an alternative embodiment, the holder assembly can be formed such that the clamping members are integrally formed of a unitary piece and the hinge joint is in form of an elastic material portion, which can be elastically deflected and the gap between the seating surfaces of the clamping members is, in an initial stage unaffected by the spring force, smaller than the thickness of the cutting tool insert that is adapted to be inserted into the holder assembly. With a holder assembly formed in this way the clamping members have to be bent apart in order to allow insertion of the cutting tool insert and will accordingly contribute to the clamping force against the cutting tool insert. One advantage with such an embodiment is that the required spring force from the compression spring member will be smaller such that its dimensions can be reduced.

BRIEF DESCRIPTION OF THE DRAWINGS

Exemplary embodiments of the invention will hereinafter be described with reference to the drawings, in which:

FIG. 1 is a perspective view of a holder assembly with a cutting tool insert according to a first embodiment of the invention;

FIG. 2 is a side view of the holder assembly in FIG. 1;

FIG. 3 is a partly exploded perspective view according to FIG. 1;

FIG. 6 is a view from above of the holder assembly having a releasing member inserted;

FIG. 7 is a cross section along the line VII-VII in FIG. 6 showing the releasing member in an initial inserting position;

FIG. 9 is a perspective view of a holder assembly according to a second embodiment of the invention;

FIG. 10 is a side view of the holder assembly according to FIG. 9;

FIG. 11 is an exploded perspective view according to FIG. 9;

FIG. 12 is a cross section through the holder assembly according to FIGS. 9-11 along the line XII-XII in FIG. 13;

FIG. 13 is a view from above of the holder assembly according to FIGS. 9-12;

FIG. 14 is an exploded perspective view of a holder assembly according to the invention;

FIG. 15 is a cross section through the holder assembly in FIG. 14 in a clamping position; and FIG. 16 is a cross section according to FIG. 15, in which the holder assembly is in a releasing position.

DETAILED DESCRIPTION OF EMBODIMENTS OF THE INVENTION

Figure 4:
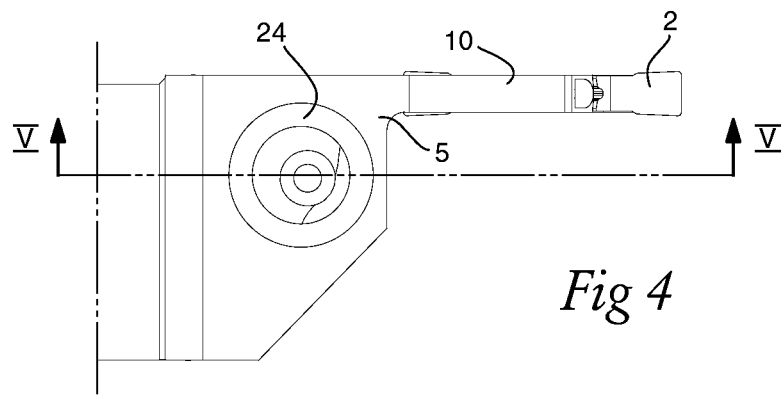
FIG. 4 is a view from above of the outer end of the holder assembly according to FIGS. 1-3.

A first embodiment of the invention is described with reference to FIGS. 1-8, in which are shown a cutting tool including a holder assembly 1 and a cutting tool insert 2. In this example, the holder assembly has the shape of a long narrow shaft 3, having a quadrangular cross-sectional shape, which at a front end is formed with first and second clamping members 4, 5. Said clamping members are spaced-apart by a gap 6, which at the back transforms into a cylindrical, through cavity 7. The holder is, in its entirety, manufactured from steel or other material having a certain inherent elasticity. Thanks to the existence of the gap, the clamping members may be brought to swivel in relation to each other by elastic deflection in a narrow material portion 8, which forms an elastic hinge joint that connects the first and second clamping members to each other. A so-called blade tongue 9 is formed in the extension of the first clamping member 4 and a clamping finger 10 is formed in the extension of the second clamping member 5. Together, the blade tongue and the clamping finger define a jaw-like seat 11 in which the cutting tool insert 2 may be inserted and clamped. In practice, the blade tongue and the clamping finger, together with the cutting tool insert, have a thickness, which amounts to only a fraction of the total width of the holder assembly. Thus, the width of the holder assembly may be 5-20 times larger than the thickness of the blade tongue and the clamping finger.

As far as the shown holder assembly has been described hitherto, the same is in all essentials previously known.

Figure 5:
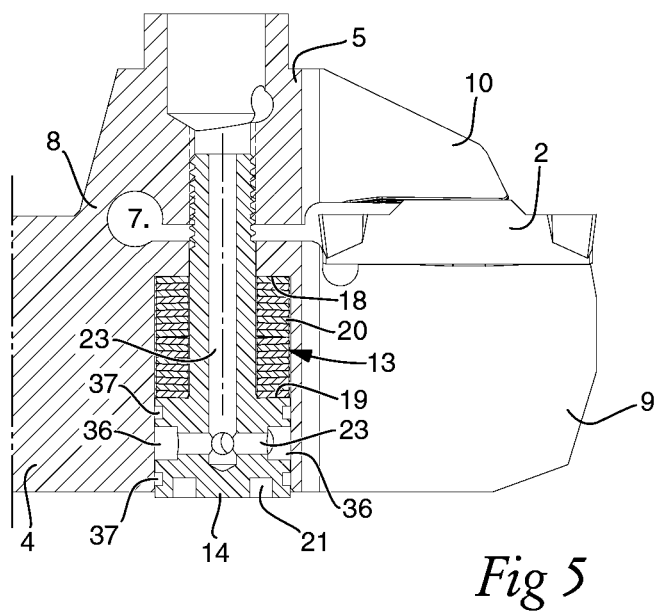
FIG. 5 is a cross section along the line V-V in FIG. 4.
Figure 8:
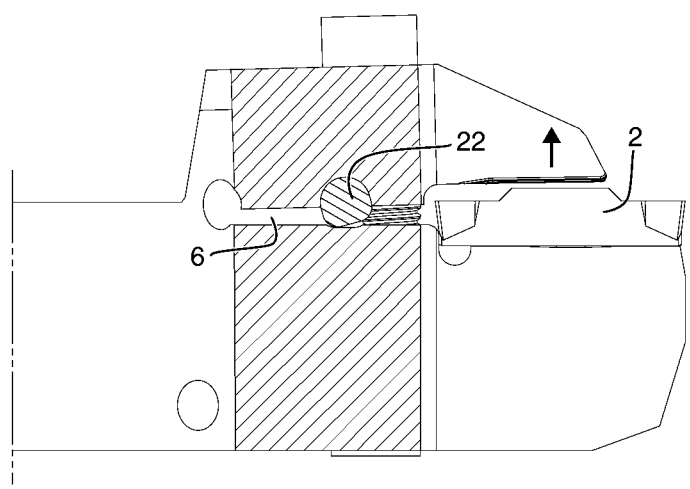
FIG. 8 is a cross section according to FIG. 7 showing the releasing member in a releasing position and the second clamping member being somewhat moved away from the first clamping member.

According to the invention, the holder assembly includes a clamping mechanism, comprising a drawbar 12 and a compression spring member 13. The drawbar is in form of a screw or bolt, including a head 14, a shaft 15 having a smooth first portion 15 and a second portion 15 having a male thread in the end portion opposite the head. A cavity or hole, as is best seen in FIG. 5, is formed in each of the first and the second clamping members which cavities are aligned with each other and extend in a transverse direction in relation to the intermediate gap 6. The gap 6 separating first and second clamping members 4, 5 extends from a distance rearward of the drawbar 12, i.e. on the opposite side of the drawbar in relation to the seat 11, in the front direction towards the seat. In the front direction, the gap transforms into the seat, which comprises a rear end support 16 for the insert which normally is arranged in the first clamping member 4.

The drawbar 12 is connected to the second clamping member 5 by means of a threaded joint between the male thread on the bolt and a female thread within the hole in the second clamping member. The cavity in the first clamping member is formed with two different cross-sectional dimensions. More precisely a first cross sectional dimension in a region closest to the gap 6 which essentially corresponds to the cross sectional dimension of the shaft of the drawbar, and a wider cross sectional dimension, which accommodates also the compression spring member 13 and the bolt head 14. In the transition section between the portion of the cavity having the narrow cross sectional dimension and the portion having the larger cross sectional dimension, a shoulder face 18 is formed which is facing away from the gap 6. The first portion 15 of the drawbar 12 is at least to a limited extent displaceable within the cavity of the first clamping member 4 and the inner side of the bolt head forms a counter face 19, which is turned towards the shoulder face 18 in the cavity. Within the cavity section having the larger cross sectional dimension, the compression spring member 13 is positioned between the counter face 19 of the bolt and the shoulder face 18 of the cavity. The compression spring member is, in the illustrated embodiment, a cup spring composed of several cup-shaped washers 20 having a central through opening, through which the shaft of the bolt is extended, as is illustrated in the partly cross sectional view in FIG. 5. In this embodiment the concave sides of half of the stack of cup-shaped washers are turned in one direction and the other half of the stack in the other.

With a holder assembly as described above which is provided with a cutting tool insert 2 between the seating surfaces of the clamping members, as illustrated in FIG. 5, the bolt can be tightened by means of a suitable tightening tool engaging in engagement recesses 21 in the outer surface of the bolt head 14 such that the threaded second portion 15 of the bolt shaft is screwed into the second clamping member 5. By this action the inner counter face 19 of the bolt head 14 will be tightened towards the cup spring 13 which, in its turn, will be pressed towards the shoulder face 18 inside the cavity. Thereby, the first and second clamping members 4, 5 will be forced towards each other such that the cutting tool insert 2 will be clamped between the seating surfaces and the cup spring will be tensioned. Accordingly, the cutting tool insert can be clamped with a desirable force by adjustment of the bolt.

According to the invention, releasing of the holder assembly is achievable by means of a releasing member 22, which is illustrated in FIGS. 1, 6 and 7. The releasing member is in all three embodiments illustrated herein formed as a torsion rod comprising two shanks being angled 90° in relation to each other. The longer shank of the torsion rod has the function of a handle, for gripping by an operator's hand, whereas the shorter shank of the torsion rod is formed with an engagement formation and is adapted to be inserted into a recess 17 in the holder assembly. In the embodiment according to FIGS. 1-8, the recess is formed as a groove being part-circular in cross section and located in the surface of the second clamping member 5 which is facing the gap 6 between the first and second clamping members. The engagement formation of the torsion rod is part-circular in cross section over a part of its circumference and the remaining part of the circumference is essentially flat. Accordingly, the engagement formation can easily be inserted into the recess with its flat portion turned towards the upper surface of the first clamping member 4, as is illustrated in FIG. 7. From this position the torsion rod can be rotated to the position according to FIG. 8 in which the part-circular circumference bears against the upper surface of the first clamping member 4. In this position of the torsion rod, the spring force from the cup spring will be overcome and the second clamping member 5 will be lifted and moved away from the first clamping member, such that the gap 6 between the seating surfaces will increase and the cutting tool insert 2 can be removed and a new one inserted. After insertion of a new cutting tool insert, the releasing member can be reset to the position according to FIG. 7 and the holder assembly will, due to the compression spring member 13, automatically clamp the new cutting tool insert with the desired clamping force as set by means of the bolt 12. The releasing member 22 can thereafter preferably be removed from the recess 17.

The clamping bolt 12 of the above described first embodiment of the holder assembly is moreover provided with internal channels 23, as is illustrated in FIG. 5, and an inlet 24 as is best seen from FIGS. 1-3, for connecting a cooling liquid tube to the holder assembly. Moreover, the holder assembly is formed with internal channels (not shown), which connect the cavity of the first and second clamping members with discharge holes 25 at the forward ends of the blade tongue and the clamping finger, respectively, which are visible in FIGS. 1 and 3. Accordingly, in this embodiment, the clamping bolt is used not only for clamping purposes, but also for distributing cooling liquid from just one connected tube to both of the clamping members such that cooling liquid can be sprayed towards the cutting tool insert 2 from above as well as from below during machining. This is a great advantage since the only connection between the two clamping members, in addition to the clamping bolt, is the narrow material portion 8 and forming a liquid channel in this narrow material portion is difficult to do without disturbing and jeopardizing the function of the holder assembly. In the illustrated embodiment, the internal channels 23 is provided with outlets 36 in the bolt head 14 and seals 37 are arranged between the head and the cavity on opposite sides of the outlets, in order to connect the internal channels 23 of the bolt with the not shown internal channels of the holder assembly.

Referring now to FIGS. 9-13, in which is illustrated a second embodiment of a holder assembly 1 according to the invention. In this embodiment, the clamping bolt 12 extends through the entire first and second clamping members 4, 5, such that a bolt head 14 is positioned on the outside of the second clamping member 5 and a nut 26, which is screwed onto the opposite end of the bolt shaft, projects from the opposite side of the first clamping member 4. Accordingly, the bolt is not attached to any of the clamping members by being screwed into a female thread in the cavities or holes in the clamping members. Instead, the entire bolt shaft 15 is at least to a limited extent displaceable within the cavities. Moreover, this embodiment is provided with two separate compression spring members in form of two separate cup springs 13, 13. One cup spring 13 is positioned between the nut 26 and a bottom 18 of a shallow countersink in the first clamping member, wherein the bottom of the countersink functions as a shoulder face and an inner side 19 of the nut as a counter face. The other cup spring 13 is positioned between the outer surface 27 of the second clamping member 5 and an inner side 28 of the bolt head 14, wherein the outer surface of the clamping member functions as a shoulder face 18 and the inner side of the bolt head as a counter face 19. In this embodiment, the clamping bolt is not provided with any internal channels for distribution of cooling liquid to the clamping members. In all other respects, the second embodiment corresponds to the first embodiment and for that reason a description of further parts and features are omitted for simplicity's sake.

A third embodiment of the invention is disclosed in FIGS. 14-16. In this embodiment the first and second clamping members 4, 5 are not connected through a flexible joint. Instead, the first and second clamping members are separate parts held together only by means of the clamping bolt 12. The figures illustrate the outermost end of the holder assembly in which a cutting tool insert 2 and a shim plate 29 are inserted in a seating in a first clamping member 4. A separate second clamping member 5 is clamped towards the first clamping member by means of a clamping bolt 12, of which a bolt head 14 is located in a countersink in the second clamping member, a bolt shaft 15 extends through the second and first clamping members and a nut 26 is screwed onto an end of the bolt shaft and positioned in a countersink from the underside of the first clamping member. A compression spring member in form of a cup spring 13 is positioned around the bolt shaft 15 in the countersink between a bottom 18 of the countersink, which serves as a shoulder face, and the inner surface of the nut which serves as a counter face.

In the clamping position, as is illustrated in FIG. 15, the second clamping member 5 is forced towards the first clamping member 4 by the spring member 13, which acts between the counter face 19 of the nut 26 and the shoulder face 18 of the first clamping member and accordingly draws the bolt in the downward direction, such that a projecting pin 30 of the second clamping member is drawn into engagement with a recess 31 in the cutting tool insert 2 and an engagement formation 32 in the rear end of the second clamping member 5 is positioned in a mating engagement formation 33 in the first clamping member 4.

In FIG. 14 is shown a releasing member in form of a torsion rod 22 similar to the previously illustrated and described torsion rod. The engagement formation on the short shank of the torsion rod is in this embodiment formed with two essentially flat portions 34 separated by two part-circular portions. The short shank of the torsion rod can be inserted into a hole 35 in a side surface of the holder assembly, as is shown in FIG. 14, when the flat portions of the engagement formation is in a horizontal orientation. The hole 35 is directed in 90° in relation to the countersink and the clamping bolt 12 and when the torsion rod is inserted into the hole 35, the upper flat portion of the engagement formation will be located adjacent the end of the bolt, as is illustrated in FIG. 15. By rotating the torsion rod about 90°, a part-circular portion of the engagement formation will be turned towards the end of the bolt, as is illustrated in FIG. 16, such that the spring force is overcome and the bolt 12 as well as the second clamping member 5 are lifted and the cutting tool insert 2 can be replaced or rotated such that another cutting edge is located in a cutting position. With a holder assembly according to this embodiment, it would also be possible to use inserts which are not provided with any recess into which the second clamping member can engage. The clamping member could for example act on a flat surface of an insert, or on a protrusion on a top surface of an insert.

The invention claimed is:

1. A holder assembly for a cutting tool insert adapted for machining operations, the holder assembly comprising:
first and second spaced apart clamping members, each of the clamping members having respective inner seating surfaces facing one another and defining an intermediate gap in which the cutting tool insert is insertable, wherein the clamping members are by means of a clamping mechanism, at least to a limited extent, movable towards each other in order to clamp and securely hold the cutting tool insert between the seating surfaces, and subsequently movable away from each other by releasing the clamping mechanism in order to release the cutting tool insert from the holder assembly, wherein the clamping mechanism includes a drawbar, which is at least partly received in a cavity formed in each of the clamping members, the cavities being aligned with each other and extending in a transverse direction in relation to the intermediate gap, wherein at least a first clamping member is formed with a shoulder face located within or around the cavity and facing away from the intermediate gap, and the clamping mechanism, besides the drawbar (12), having a compression spring member, wherein the drawbar has a first portion received in the cavity of and in engagement with the first clamping member and a second portion received in the cavity of and in engagement with the second clamping member, at least the first drawbar portion is at least to a limited extent displaceable within the cavity of the first clamping member and is formed with a counter face facing the shoulder face of the clamping member, and the compression spring member is positioned between the counter face of the drawbar and the shoulder face of the clamping member such that the compression spring member acts upon the counter face and the shoulder face with a force acting to move the counter face and the shoulder face away from each other such that the clamping members are pressed towards each other for secure clamping of the cutting tool insert, and releasing of the clamping mechanism is achievable by means of a releasing member which is able to overcome the spring force acting to move the clamping members towards each other.

2. A holder assembly according to claim 1, wherein the clamping members are movable in relation to each other by turning around a hinge joint.

3. A holder assembly according to claim 2, wherein the clamping members are integrally formed in a unitary piece and the hinge joint is an elastic material portion, which can be elastically deflected.

4. A holder assembly according to claim 1, wherein the compression spring member is a cup spring composed of several cup-shaped washers.

5. A holder assembly according to claim 4, wherein the cup-shaped washers are turned with their concave sides of consecutive cup-shaped washers alternately in one direction and alternately in the other direction.

6. A holder assembly according to claim 1, wherein the compression spring member is accommodated in a cavity within a clamping member.

7. A holder assembly according to claim 1, wherein the compression spring member is secured in the cavity by a bolt, which is positioned with a head thereof in the cavity in one of the clamping members the bolt extends through the compression spring member and is displaceably passed through the cavity, passes through the gap between the two clamping members and is secured in a threaded bore in the other clamping member.

8. A holder assembly according to claim 1, wherein the releasing member is adapted to act between the clamping members to displace the clamping members a distance from each other against the spring force.

9. A holder assembly according to claim 1, wherein the drawbar includes a through passage that allows a flow of cooling fluid from one clamping member to the other.

10. A holder assembly according to claim 1, wherein a recess for insertion of a releasing member is provided in connection with the gap.

11. A holder assembly according to a claim 1, wherein the cutting tool insert is positioned between the seating surfaces.

12. A holder assembly according to claim 11, wherein the clamping members are integrally formed in a unitary piece and the hinge joint is in form of an elastic material portion, which can be elastically deflected and the gap between the seating surfaces of the clamping members is, in an initial stage unaffected by the spring force, and smaller than the thickness of the cutting tool insert such that the clamping members have to be bent apart in order to allow insertion of the cutting tool insert to contribute to the clamping force against the cutting tool insert.

* * * * *